United States Patent [19]
King

[11] Patent Number: 5,862,959
[45] Date of Patent: Jan. 26, 1999

[54] WATER DISPENSING SYSTEM FOR A BREWING MACHINE

[76] Inventor: Alan M. King, 4369 Montrose Avenue, Westmount, Quebec, Canada, H3Y 2B2

[21] Appl. No.: 743,665

[22] Filed: Nov. 5, 1996

[51] Int. Cl.[6] .............................. B65D 88/54; B67D 5/62; G01F 11/00
[52] U.S. Cl. ........................ 222/319; 222/137; 222/146.5; 222/405
[58] Field of Search ..................................... 222/319, 405, 222/146.5, 137, 579

[56] References Cited

U.S. PATENT DOCUMENTS

| | | | |
|---|---|---|---|
| 2,786,408 | 3/1957 | Herrera ....................................... | 99/283 |
| 2,869,760 | 1/1959 | Karlen et al. ............................ | 222/319 |
| 3,640,433 | 2/1972 | Rodth ................................... | 222/129.2 |
| 3,790,028 | 2/1974 | Gardner, Jr. et al. ................. | 222/129.4 |
| 4,133,354 | 1/1979 | Lerner et al. . | |
| 4,632,023 | 12/1986 | King . | |
| 4,713,253 | 12/1987 | Stone, Jr. ................................ | 426/433 |
| 4,713,526 | 12/1987 | Smit . | |
| 4,791,859 | 12/1988 | King . | |
| 4,881,380 | 11/1989 | Mrugala et al. ........................... | 62/389 |
| 4,903,586 | 2/1990 | King . | |
| 4,922,809 | 5/1990 | Fühner . | |
| 4,967,647 | 11/1990 | King .......................................... | 99/280 |
| 5,346,098 | 9/1994 | King . | |

*Primary Examiner*—Andres Kashnikow
*Assistant Examiner*—Keats Quinalty
*Attorney, Agent, or Firm*—Hill & Simpson

[57] ABSTRACT

A water displacement block for a beverage brewer, mounted on a pivot and connecting rods and suspended immediately over a hot water tank and which, at a specific time in the brewing cycle, is lowered into the tank, thus causing water to overflow so as to dispense the correct amount of hot water into the brewing machine. Next to the hot water dispensing tank a secondary water tank is mounted which is connected to a water pump driven by the same motor which drives the beverage brewer. During a single cycle, the pump will discharge the same amount of water into the hot water tank as was dispensed when the water displacement block was lowered into the tank. The cold water entering the system is pre-heated because it passes downwardly and under a partition in the tank adjacent the hot water is the discharge portion of the tank.

14 Claims, 3 Drawing Sheets

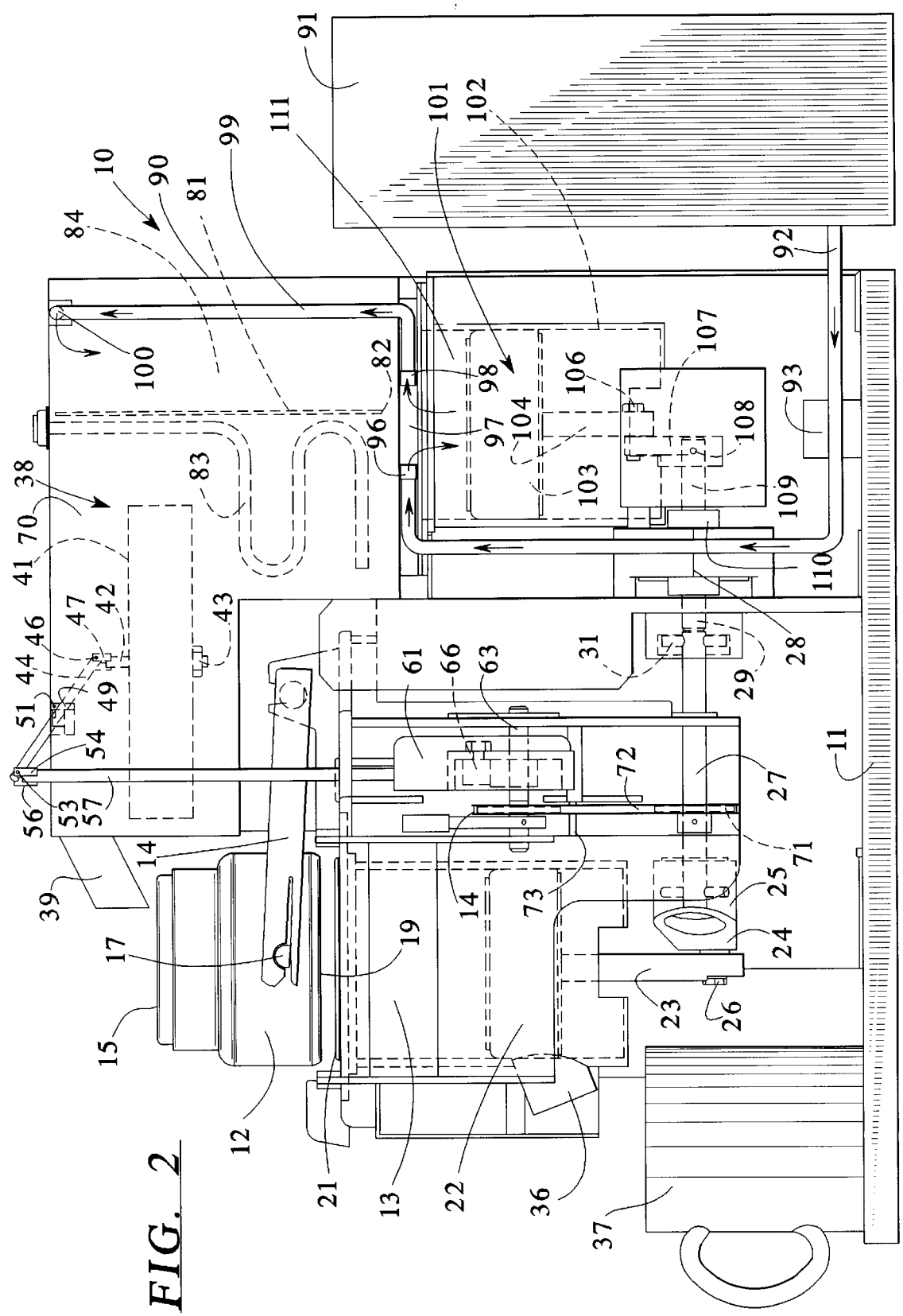

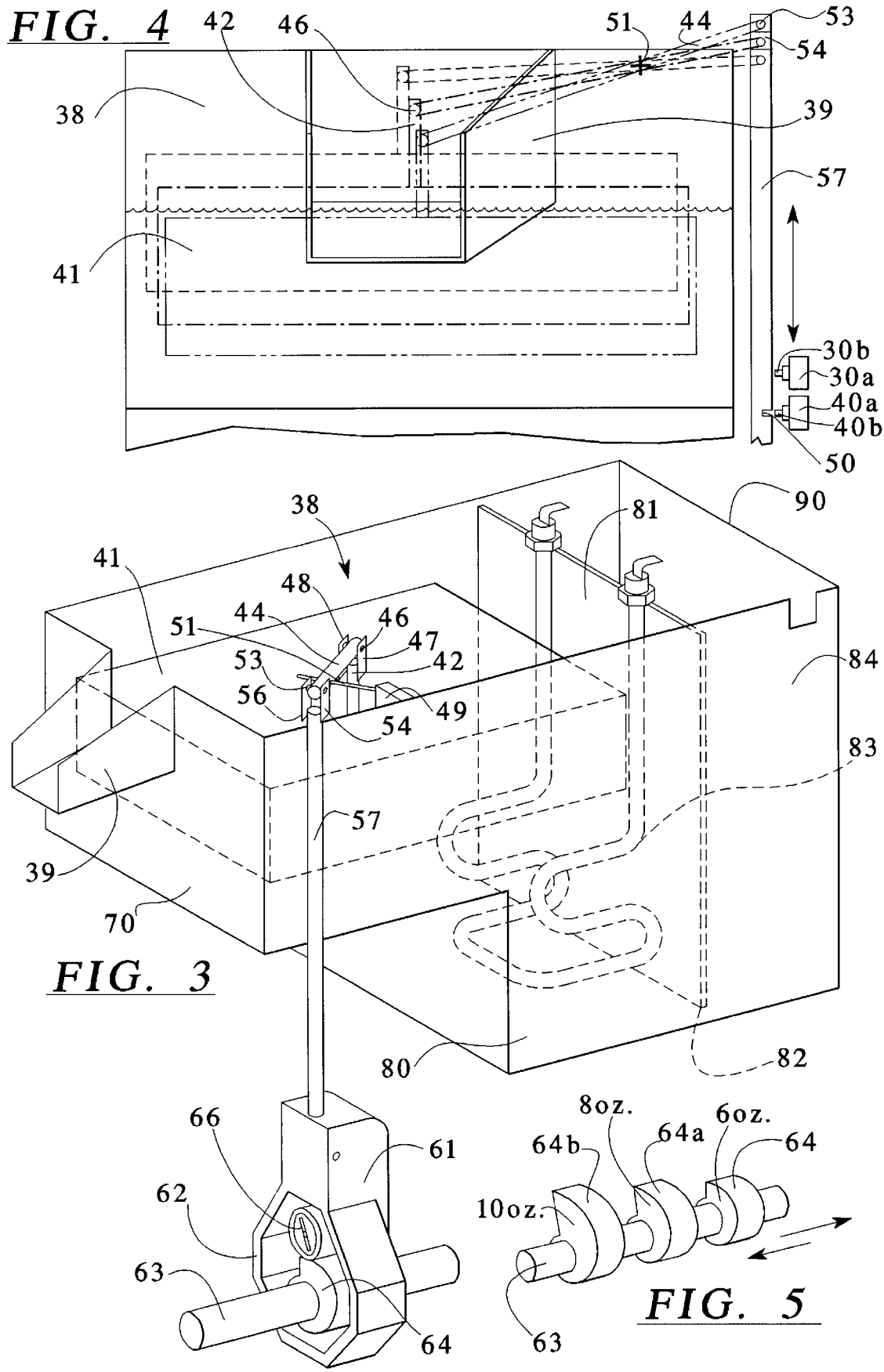

WATER DISPENSING SYSTEM FOR A BREWING MACHINE

CROSS-REFERENCES TO RELATED APPLICATIONS

The present invention relates to U.S. Pat. No. 5,697,288, Issued Dec. 16, 1997 in which the inventor is Alan M. King, entitled "ENCAPSULATING COFFEE BETWEEN TWO LAYERS OF PAPER" the inventor of the present application, U.S. Pat. No. 5,642,655, Issued Jul. 1, 1997 in which the invention is Alan M. King, entitled "APPARATUS FOR ADVANCING COFFEE TAPE IN A COFFEE BREWER", and U.S. Pat. No. 5,735,189, Issued Apr. 7, 1998 in which the inventor is Alan M. King entitled "WATER DIPPER FOR A BREWING MACHINE".

BACKGROUND OF THE INVENTION

1. Field of the Invention

This invention relates in general to a hot water supply apparatus for a beverage brewing machine.

2. Description of the Related Art

Beverage brewing machines such as coffee machines require a supply of hot water so as to brew the beverage. A number of water supplying apparatuses are known in the prior art. For example, see U.S. Pat. Nos. 2,786,408, 4,922,809, 4,133,354, 4,713,253, 4,713,526, 4,632,023, 4,967,647, 4,791,859, 4,903,586 and 5,346,098.

SUMMARY OF THE INVENTION

The present invention relates to a hot water supply apparatus for a beverage brewing machine such as a coffee brewer wherein a hot water tank has a water displacement block suspended over it. When the water displacement block is lowered into the hot water tank, it is of such a size that it causes the hot water tank to overflow in an amount sufficient for one cup of brewed beverage. The hot water in the hot water tank is maintained at a constant level by immediately adding an amount of water to it equal to the amount dispensed so that the quantity of water discharged by the water displacement block is fixed. The hot water tank has a partition so that water added is preheated before passing under the partition into the portion of the tank from which the hot water is supplied.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 2 is a side plan view illustrating the invention;

FIG. 3 is an isometric view of the invention;

FIG. 4 is a side view of the invention; and

FIG. 5 illustrates a modification of the invention.

DETAILED DESCRIPTION OF THE PREFERRED EMBODIMENTS

Figure 1:
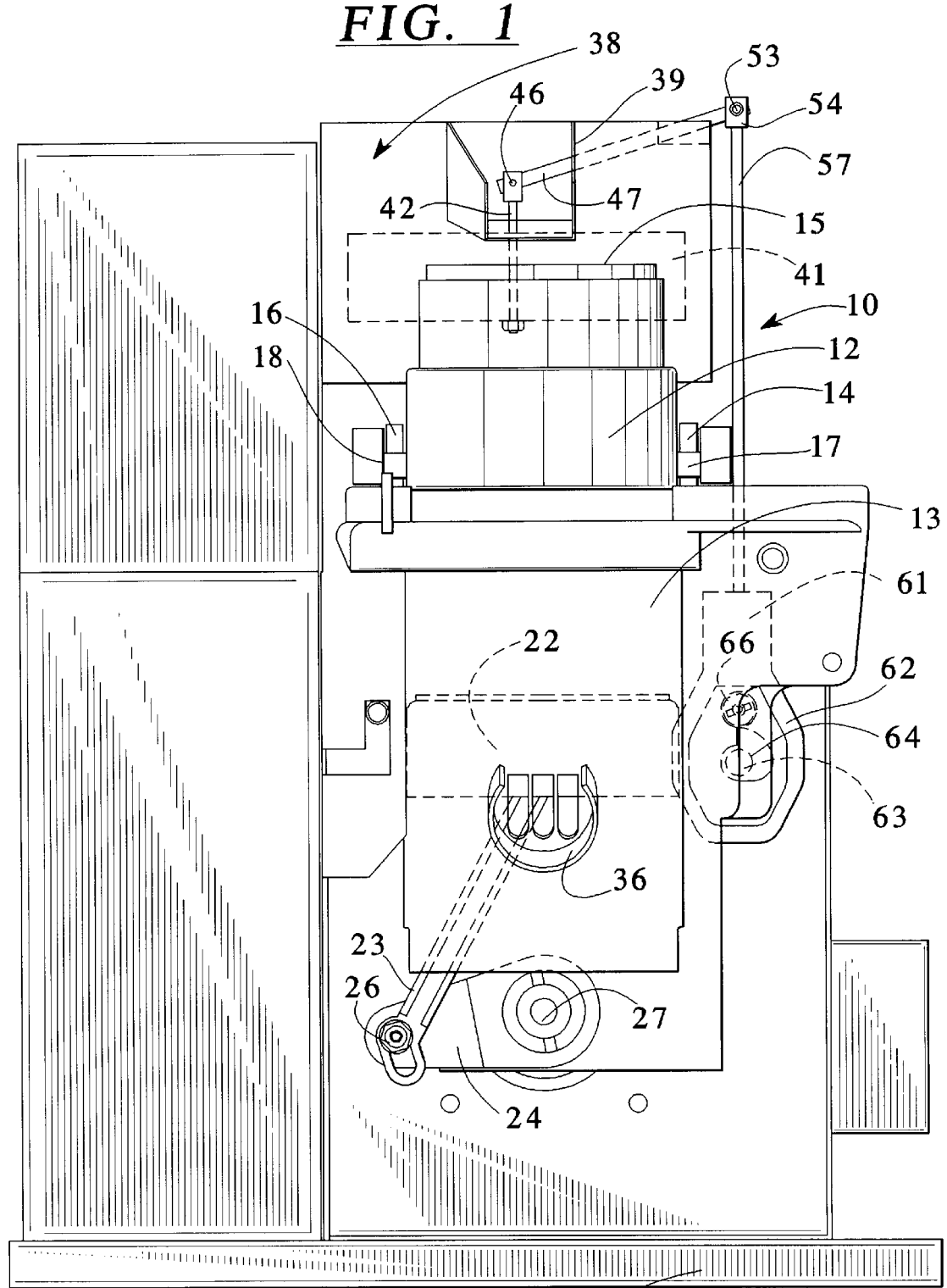
FIG. 1 is a front plan view illustrating the invention.

FIGS. 1 and 2 illustrate the improved coffee brewer 10 of the invention which is supported on a base 11. The brewer has an upper brewing chamber 12 with an upper opening 15 and a lower opening 19 and is pivotally mounted on actuating arms 14 and 16 which engage pivot pins 17 and 18 extending from the opposite sides of the upper brewing chamber 12. A lower brewing cylinder 13 is supported in the coffee brewer 10 beneath the upper chamber 12 and has an outlet spout 36 from which brewed coffee can pour into a coffee cup 37 as shown in FIG. 2. A piston 22 is movably mounted in the lower brewing cylinder 13 and is driven by connecting rod 23 which is mounted by pivot pin 26 to a crank arm 24 which is driven by a coupling 25 that connects to a main drive shaft 27 and through a coupling 31 to the drive shaft 29 of a motor 28. The operation of the upper brewing chamber 12 and the lower brewing cylinder 13 during a brewing cycle is described in my prior patents such as listed under the "Description of The Related Art" in this application and such description is hereby incorporated by reference for an understanding of the operation of the brewing machine.

In the brewing cycle it is necessary to supply a quantity of hot water to the upper brewing chamber 12 through the upper opening 15, and the present invention relates to the mechanism for supplying a quantity, for example, one cup of hot water to the upper brewing chamber 12 during each brewing cycle.

The means for supplying, hot water during each brewing cycle comprises a main tank 38 shown in FIGS. 1–4 which has a spout 39 adjacent an upper portion thereof. The tank 38 has an upper portion 70 to which the spout 39 is connected and a lower portion 80 as best shown in FIGS. 2 and 3. A partition 81 is mounted in the tank 38 in a manner so that it is parallel to the back wall 90 of the tank 38 and extends from adjacent the top to a distance such that its bottom edge 82 is offset from the bottom of the lower portion of the tank 80 as best shown in FIGS. 2 and 3.

A water displacement block 41 having a general configuration of the upper portion of the tank 38 between the partition 81 and the sidewalls of the tank is movably mounted within the tank 38 so as to periodically displace water in the tank and cause a measured quantity to flow from the spout 39 into the opening 15 of the upper brewing chamber 14. The displacement block 41 is attached to a vertical pin 42 which passes through the block 41 and has its lower end connected to a nut 43 as best shown in FIG. 2. A bracket 47 is mounted on the upper end of the pin 42 and a pivot pin 46 extends through the bracket 47 and through the lower end of an actuating shaft 44. A bracket 49 is connected to the sidewall of the tank 38 and has a pivot pin 5 i which passes through the shaft 44 to pivotally support it. The upper end of the shaft 44 is connected by a pivot pin 53 to links 54 and 56 which are connected to a shaft 57.

The lower end of shaft 57 is connected to an actuator 61 which has a cam follower portion 62. A cam 64 is mounted on shaft 63 and a cam follower roller 66 is mounted in the cam follower 62 and engages the cam 64. The shaft 63 is rotatably mounted in the coffee brewer 10 as best shown in FIG. 2 and is driven through gears 71, 72 and 74. Gear 71 is fixedly mounted on drive shaft 27 and gear 72 is mounted on a support shaft 73 and gear 74 is fixedly mounted on shaft 63.

A heater 83 is mounted in the tank 38 so as to heat the water. The portion 84 of the tank 38 between the partition 81 and the end wall 90 is periodically supplied cold water through a supply conduit 99 which has its upper end outlet 100 adjacent the top of tank portion 84.

As best shown in FIG. 2, a secondary tank 91 contains cold water and has an outlet conduit 92 at its lower end which passes through a bracket 93 in the brewer 10 and up to a chamber 97 through a one-way valve 96. A pump 101 has cylinder 102 and a piston 103. The piston 103 is driven by a piston rod 104 which is pivotally attached by a pin 106 to a crank arm 107 which is fixed to a drive shaft 109 by a pin 108. The shaft 109 is driven by the motor 28 through a coupling 110. The water chamber 97 communicates with the space 111 above piston 101 so that water from tank 91 will be drawn through the one-way valve 96 into the upper portion 111 of the cylinder 102 as the piston 101 moves downwardly. When the piston 101 is moved upwardly by the shaft 109 and crank arm 107 and piston rod 104, water is forced from the upper portion 111 of the cylinder 102 into the chamber 97 and through a one-way valve 98 into the conduit 99 which discharges the water through opening 100 into the portion 84 of the tank 38. The one-way valve 96 allows water to pass into the chamber 97 but prevents water from passing from the chamber 97 back into the tank 91 through the conduit 92. The one-way valve 98 allows water from chamber 97 to pass through conduit 99 into the tank portion 84 but prevents water from passing from the tank 84 into the cylinder 111.

Another method of transferring cold water from the secondary tank would be to use an electronic level control in the hot water tank which would switch on a vane or other type of water pump which would refill the hot water tank through use or through evaporation.

In operation, when the beverage brewer 10 is energized for making a cup of coffee, the motor 28 rotates shafts 29, 27 and 109. The upper brewing chamber 12 is initially sealed to the lower brewing cylinder 13 as described in my above referenced patents, and displacement block 41 is moved downwardly by the shaft 27 and gears 71, 72 and 74 and shaft 63, cam 64 and cam follower 61, and shaft 57 so as to move shaft 44 in a direction which moves the displacement block 41 down into the water in portion 70 of the tank 38 so as to cause water to overflow from the tank portion 70 into the spout 39 and into the upper brewing chamber 12. The motor 28 continues to operate and then moves the piston 22 downwardly to draw the hot water through the coffee which is mounted between the sealed ends 19 and 21 of the upper brewing chamber 12 and the lower brewing cylinder 13. The piston 22 continues downwardly so as to allow the coffee to pass through spout 36 into the coffee cup 37. As previously stated, this operation of the coffee brewer is well described in the prior art patents referenced above which are hereby incorporated by reference.

During the brewing cycle, motor 28 also drives the piston 103 of the pump 101 downwardly through the connecting rod 104, pin 106, crank arm 107, shaft 109 and coupling 110 so that cold water from secondary tank 91 is drawn into chamber 97 and into the upper chamber 111 of the pump 101 through the one-way valve 96. As the motor 28 continues to run, the piston 103 moves upwardly, driving the water in chamber 111 into the chamber 97 and through conduit 99 through opening 100 into the portion 84 of the tank 38. This cycle is repeated each time the brewer is actuated so that the water level in the tank 38 is maintained at a constant level during times when the brewer is not actuated. The timing of the pump 101 is controlled by the angular position of shaft 109 and shaft 29.

The water supplied through conduit 99 enters at the top of the tank 84. This water is cold when supplied into the tank 84 and the water passes downward under the partition into the front tank as hot water is supplied to the beverage brewer which is caused by the downward movement of the displacement block. After the hot water has been supplied to the brewer due to movement of the displacement block, the displacement block again moves upward to its initial rest position due to the action of the cam 64 and water then flows under the partition 81 so as to maintain the level in the front and back portions of the tank 38 at the same level due to hydrostatic pressure. The water supplied into the front tank passes under the partition 81 between the two tank portions. The water in the rear tank will be gradually heated as it passes downwardly into the tank and under partition 81 due to its contact with the partition 81. Thus, the water supplied to the front tank portion will be preheated which increases the efficiency of the machine.

The amount of hot water supplied to the brewer during each brewing cycle depends upon the size of the displacement block 41 and the distance that it is moved downwardly into the water in tank 38.

The amount of water can be selectively varied by controlling the vertical movement of the displacement block as shown in FIGS. 4 and 5. The amount of vertical movement of displacement block 41 depends on the vertical movement of shaft 57. One method of changing the vertical movement of shaft 57 is illustrated in FIG. 5 where two additional cams 64a and 64b are mounted on shaft 63 with cam 64. Means can be provided for moving shaft 63 to different positions relative to the cam follower 61 so as to selectively engage either cam 64, cam 64a or cam 64b. When cam 64 engages the cam follower 61, the displacement block 41 is partially lowered so that six ounces of water could be discharged through spout 39 when the brewer is actuated. Alternatively, if cam 64a is moved to engage the cam follower 61 the displacement block is further lowered so that eight ounces of water will be supplied to the brewer through spout 39. When cam 64b engages cam follower 61, the displacement block 41 is fully lowered so that ten ounces of hot water will be supplied to the brewer.

Another method of controlling the vertical movement of the displacement block can be achieved by the use of notches in the vertical shaft 57. As shown in FIG. 4, two solenoids 30a and 40a can be placed adjacent to shaft 57. For example, to dispense 6 oz of water, solenoid 40a would be engaged and its armature 40b would engage notch 50 in shaft 57 and the displacement block would be lowered a minimum amount. For an 8 oz quantity of water, solenoid 30a would be engaged and its armature 30b would engage notch 50 in shaft 57 allowing the displacement block to be lowered further, thus dispensing 8 oz of water. For a 10 oz quantity of water to be dispensed, neither solenoid 40a nor 30a would be engage, allowing the displacement block to be lowered a maximum amount.

It is seen that the invention provides a new and novel hot water supply apparatus for a beverage brewing machine which uses a water displacement block.

Although the invention has been described with respect to preferred embodiments, it is not to be so limited as changes and modifications can be made which are within the full intended scope of the invention as defined by the appended claims.

I claim as my invention:

1. A device for supplying hot water to a beverage brewer comprising:

a hot water tank having a water outlet and defining a first water height line below the water outlet;

a water displacement block suspended in said tank and having first and second vertical positions, said hot water tank defining a second water height line above the first water height line and the water outlet when the water displacement block is in the second vertical position; and a driver connected to said water displacement block.

2. The device of claim 1, wherein said water displacement block is pivotally connected to an arm movably mounted to said brewer, and has a lower end actuated by a cam mounted on a drive shaft of said driver so that said block is immersed in the water once each brewing cycle so as to cause water to flow into said beverage brewer.

3. The device of claim 2, further comprising a displacement block controller linked to the displacement block and defining a plurality of positions of the displacement block such that varying quantities of hot water may be dispensed dependent upon the position of the displacement block in the tank.

4. The device of claim 1, further comprising a water replenisher fluidly connected to said hot water tank.

5. The device of claim 4 wherein said water replenisher comprises a secondary fresh water tank connected to a positive displacement pump which has a pumping capacity of withdrawing a quantity of water from the secondary tank which is the same quantity of water which had been dispensed into the brewer so as to refill the hot water tank in preparation for the next brewing cycle.

6. A device for supplying hot water to a beverage brewer, comprising:
  a main tank with water therein and having an outlet spaced above said beverage brewer;
  a displacement block movably mounted in said tank; and
  a displacement block driver connected to said displacement block and moving said displacement block downwardly into said water in said tank by an amount proportionate to a measured quantity of hot water displaced through said outlet.

7. The device for supplying hot water to a beverage brewer according to claim 6 further comprising a heater in said tank.

8. The device for supplying hot water to a beverage brewer according to claim 6 wherein said brewer includes a brewer driver and wherein said displacement block driver is coupled to said brewer driver.

9. The device for supplying hot water to a beverage brewer according to claim 8 wherein said displacement block driver includes a first shaft rotatably driven by said brewer driver, and an actuator connected between said shaft and said displacement block.

10. The device for supplying hot water to a beverage brewer according to claim 9 wherein said actuator includes a cam mounted on said first shaft, a second shaft coupled to said displacement block and a cam follower attached to said second shaft and engageable with said cam to move said second shaft and said displacement block up and down.

11. The device for supplying hot water to a beverage brewer according to claim 8 further comprising a pump fluidly connected to said main tank.

12. The device for supplying hot water to a beverage brewer according to claim 11 wherein said main tank has a partition with space under a lower edge and said displacement block and said heater are in a first portion of said main tank on one side of said partition and said pump is fluidly connected to a second portion of said main tank on a second side of said partition.

13. The device for supplying hot water to a beverage brewer according to claim 12 further comprising a cold water tank fluidly connected to said pump.

14. The device for supplying hot water to a beverage brewer according to claim 13 wherein said pump is coupled to said brewer driver.

\* \* \* \* \*